United States Patent [19]
Browne et al.

[11] Patent Number: 6,034,600
[45] Date of Patent: Mar. 7, 2000

[54] TURN SIGNAL SYSTEM AND METHOD WITH STEERING WHEEL MOUNTED CONTROL OF CONVENTIONAL AND LANE SHIFT INDICATIONS

[75] Inventors: Joseph E. Browne, Northville; Michael Walter Malesko, Ann Arbor, both of Mich.

[73] Assignee: TRW Inc., Lyndhurst, Ohio

[21] Appl. No.: 09/027,310

[22] Filed: Feb. 20, 1998

[51] Int. Cl.[7] .................................................. B60Q 1/34
[52] U.S. Cl. .......................... 340/475; 340/476; 340/477; 116/28 R; 362/36; 362/37; 362/40; 362/41
[58] Field of Search .................... 340/475, 476, 340/477; 116/28 R; 362/36, 37, 40, 41

[56] References Cited

U.S. PATENT DOCUMENTS

| | | | |
|---|---|---|---|
| 3,576,530 | 4/1971 | Buechler et al. | 340/475 |
| 3,594,724 | 7/1971 | Evers | 340/475 |
| 4,066,851 | 1/1978 | White et al. | 200/5 A |
| 4,251,734 | 2/1981 | Mayer et al. | 290/5 |
| 4,684,918 | 8/1987 | Solomon | 340/475 |
| 5,157,372 | 10/1992 | Langford | 338/211 |
| 5,260,685 | 11/1993 | Parker | 340/477 |
| 5,269,559 | 12/1993 | Filion et al. | 280/728 |
| 5,309,135 | 5/1994 | Langford | 338/211 |
| 5,338,059 | 8/1994 | Inoue et al. | 280/728 B |
| 5,369,232 | 11/1994 | Leonelli | 200/61.54 |
| 5,398,962 | 3/1995 | Kropp | 280/731 |
| 5,399,819 | 3/1995 | Lang et al. | 200/61.54 |
| 5,423,569 | 6/1995 | Reighard et al. | 280/731 |
| 5,438,314 | 8/1995 | Evans | 340/477 |
| 5,465,998 | 11/1995 | Davis | 280/731 |
| 5,469,338 | 11/1995 | Sims | 362/61 |
| 5,486,809 | 1/1996 | Wadlington, Jr. | 340/477 |
| 5,520,412 | 5/1996 | Davis | 280/728.3 |
| 5,539,259 | 7/1996 | Filion et al. | 307/10.1 |
| 5,576,684 | 11/1996 | Langford | 338/50 |
| 5,823,666 | 10/1998 | Kingsolver | 362/488 |

*Primary Examiner*—Jeffery A. Hofsass
*Assistant Examiner*—Toan Pham
*Attorney, Agent, or Firm*—Tarolii, Sundheim, Covell, Tummino L.L.P.

[57] ABSTRACT

A vehicle turn signal system (10), and an associated method, utilizes turn selectors (14, 16) located on a steering wheel (12). The system has right and left turn signal indicator circuits (34, 38) that are each energizable to indicate an intended movement of the vehicle toward the right or left, respectively. A micro-controller 20 controls the energization of the right and left turn indicator circuits (34, 38). Each of the right and left selectors (14, 16) is actuatable in a first manner for causing the micro-controller (20) to energize the respective indicator circuit (34 or 38) to perform a first indication operation and actuatable in a second manner for causing the micro-controller to energize the respective indicator circuit (34 or 38) to perform a second indication operation. In one embodiment, the first manner of selector actuation is a relatively short duration actuation, and the second manner of selector is a relatively long duration actuation. Also, in one embodiment, the first indication operation is a timed duration indication for lane changing and the second indication operation is conventional turn indication (e.g., indication until cancelled).

18 Claims, 3 Drawing Sheets

TURN SIGNAL SYSTEM AND METHOD WITH STEERING WHEEL MOUNTED CONTROL OF CONVENTIONAL AND LANE SHIFT INDICATIONS

TECHNICAL FIELD

The present invention relates to vehicle turn signal systems, and particularly relates to a system that does not employ a selector lever or stalk mounted on a steering wheel column.

BACKGROUND OF THE INVENTION

Vehicle turn signal systems are known in the art. One know type of vehicle turn signal system has a selector lever or stalk mounted on a steering wheel column for operation by a driver of the vehicle.

SUMMARY OF THE INVENTION

In accordance with one aspect, the present invention provides a turn signal system for a vehicle having a steering wheel. Within the system, energizable right signal means indicates an intended movement of the vehicle toward the right. Energizable left signal means indicates an intended movement of the vehicle toward the left. Control means selectively supplies energy to the right and left signal means. The system includes right selector means, located on the steering wheel, and left selector means, located on the steering wheel. The right selector means is actuatable in a first manner for causing the control means to energize the right signal means to perform a first indication operation and actuatable in a second manner for causing the control means to energize the right signal means to perform a second indication operation. The left selector means is actuatable in a first manner for causing the control means to energize the left signal means to perform a first indication operation and actuatable in a second manner for causing the controller to energize the left signal means to perform a second indication operation.

In accordance with another aspect, the present invention provides a turn signal system in which right selector means is actuatable in a manner below a predetermined right selector threshold for causing the control means to energize the right signal means to perform a first indication operation, and the right signal means is actuatable in a manner above the predetermined right selector threshold for causing the control means to energize the right signal means to perform a second indication operation. Also, within the system, left selector means is actuatable in a manner below a predetermined left selector threshold for causing the control means to energize the left signal means to perform a first indication operation, and the left signal means is actuatable in a manner above the predetermined left selector threshold for causing the controller to energize the left signal means to perform a second indication operation.

In accordance with another aspect, the present invention provides a turn signal system in which right selector means is actuatable in a first manner for causing the control means to energize the right signal means in an indication operation of predetermined duration, and the right selector means is actuatable in a second manner for causing the control means to energize the right signal means in an indication operation maintained until cancelled. Left selector means actuatable in a first manner for causing the control means to energize the left signal means in an indication operation of predetermined duration and actuatable in a second manner for causing the control means to energize the left signal means in an indication operation maintained until cancelled.

In accordance with another aspect, the present invention provides a turn signal system in which the control means includes means for distinguishing between the first and second manners of actuation of the right selector means. The control means includes means for distinguishing between the first and second manners of actuation of the left selector means.

In accordance with another aspect, the present invention provides a method of indicating intended movement of a vehicle. The vehicle has a steering wheel. Actuating right selector means on the steering wheel in a first manner to cause right signal means to be energized in an indication operation of predetermined duration. Actuating the right selector means on the steering wheel in a second manner to cause the right signal means to be energized in an indication operation maintained until cancelled. Actuating left selector means on the steering wheel in a first manner to cause left signal means to be energized in an indication operation of predetermined duration. Actuating the left selector means on the steering wheel in a second manner to cause the left signal means to be energized in an indication operation maintained until cancelled.

BRIEF DESCRIPTION OF THE DRAWINGS

The foregoing and other features and advantages of the present invention will becomes apparent to one skilled in the art to which the present invention relates upon consideration of the following description of the invention with reference to the accompanying drawings, wherein.

DESCRIPTION OF PREFERRED EMBODIMENT

Figure 1:
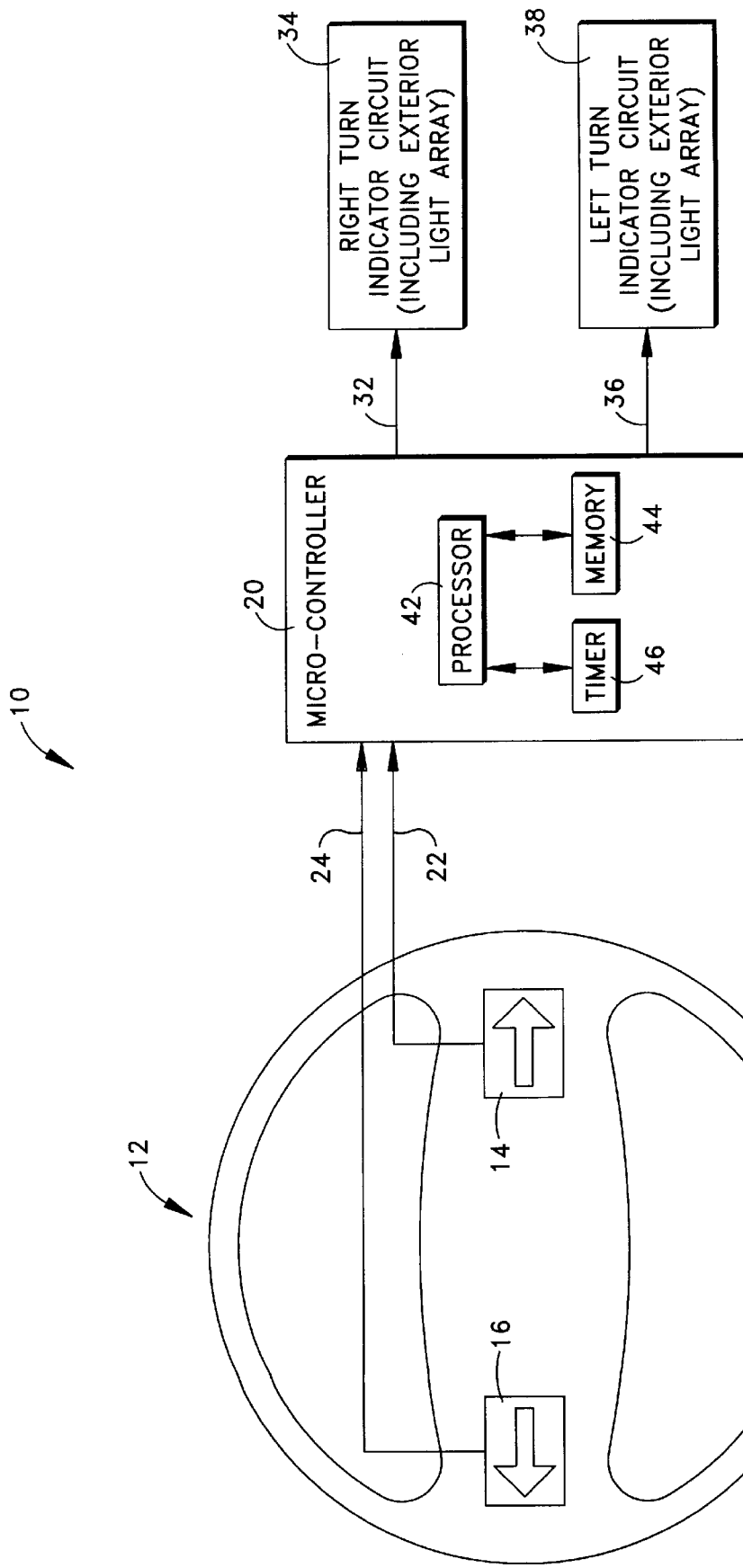
FIG. 1 is a schematic illustration of a turn signal system in accordance with the present invention.

A schematic illustration of a turn signal system 10 for a vehicle is shown in FIG. 1. A steering wheel 12 of the vehicle has right-turn and left-turn selectors 14 and 16. Preferably, the right-turn selector 14 is located on the right side of the steering wheel 12 and the left-turn selector 16 is located on the left side of the steering wheel when the steering wheel is the neutral steer position, as shown in FIG. 1. The selectors 14 and 16 are actuatable switching devices for the driver (not shown) of the vehicle to press. Actuating (pressing) a selector 14 or 16 selects an exterior direction indication (e.g., a blinker light arrangement) that corresponds to the driver's intention to steer the vehicle for movement toward the right or left, respectively.

The selectors 14 and 16 are preferably resiliently deformable push buttons. Each selector 14, 16 has a resilient elastomer exterior layer that has a suitable indicia to inform the driver of the purpose of the selector. Preferably, the indicia are right and left pointing arrowheads, respectively, for the right and left selectors 14 and 16. Adjacent to the elastomer layer (i.e., beneath the elastomer layer, from the perspective of the driver) within each selector 14, 16 is an electrically conductive layer that has a resistivity that changes in response to elastic deformation of the conductive layer. When the driver presses one of the selectors (e.g., 14), with a thumb (or finger), the resistivity of the conductive layer within that selector changes. Deformation-responsive, variable resistance conductive layer devices are known in the art and a detailed description of such construction is omitted for the purpose of brevity.

A micro-controller 20 of the system 10 monitors electrical signals 22 and 24 that are indicative of the pressing (actuation) of the right and left selectors 14 and 16, respectively. The person of ordinary skill in the art will intuitively understand that the micro-controller 20 provides a signal 32, which causes a right turn indicator circuit 34 to energize and which causes an exterior right turn light array of the right turn indicator circuit to illuminate, when the driver presses the right-turn selector 14. The illumination of the light array is referred to as a turn indication or a turn indicator signal. Similarly, the micro-controller 20 provides a signal 36, which causes a left turn indicator circuit 38 to energize and which causes an exterior right turn light array of the light turn indicator circuit to illuminate, when the driver presses the left-turn selector 16.

In accordance with the present invention, the system 10 provides indication input/control, via the selectors 14, 16 on the steering wheel 12, for both large angle, conventional turns (e.g., a 90 degree turn around a street corner) and small angle turns or shifts (e.g., a lane change). Thus, the need for a turn signal lever or stalk on a column of the steering wheel is obviated. Preferably, the indication for a large angle, conventional turn is the flashing or "blinking" of the appropriate (right or left) light array until the blinking is cancelled. Cancellation occurs as a result of a rotation of the steering wheel 12 back toward the neutral-steer position after the turn is completed or the blinking is manually cancelled, as is described below. The indication for a small angle steer or shift is a short-duration blinking period of the appropriate (right or left) light array. The short duration blinking period is predetermined. In one preferred embodiment, the duration is approximately eight seconds and provides approximately eight flashes or "blinks" of the appropriate (right or left) light array. The types of indication (i.e., short duration blinking and blinking until canceled) are referred to as first and second indication operations, respectively.

In order to accomplish this control from the steering wheel 12, each of the selectors 14, 16 can be operated in two manners and the micro-controller 20 includes means for discerning the manner of operation of each selector 14, 16. Preferably, the first manner of operation of each selector 14, 16 is a relatively short duration deformation caused by the driver's thumb (or finger), and the second manner of operation of each selector is a relatively long duration deformation caused by the driver's thumb (or finger). The short duration deformation corresponds to a request to signal an intended small angle turn (e.g., lane change) of the vehicle, and the long duration deformation corresponds to a request to signal an intended large angle turn (e.g., conventional turn) of the vehicle. The signals 22 and 24 convey the information regarding the occurrence and the duration of deformation to the micro-controller 20. Herein, the preferred definitions for deformation duration is less that 0.25 seconds for the "short" duration and greater than or equal to 0.25 seconds for the "long" duration. Thus, 0.25 second is a time threshold. For the purpose of easy reference, large angle turns (conventional) and small angle turns (lane change) are sometimes referred to herein simply as "turns".

A processor 42 of the micro-controller 20 determines the manner of operation (i.e., deformation duration) of the selector (e.g., 14), and provides the appropriate signal (e.g., 32) to control the selected indicator circuit (e.g., 34). Specifically, the micro-controller 20 includes a memory 44 and timer function 46 operatively connected with the processor 42. When a selector (e.g., 14) is actuated (pressed by the driver), the timer function 46 determines the duration of the actuation. The processor 42 determines if the duration of the actuation is shorter or longer than the predetermined time threshold (e.g., 0.25 seconds). If the actuation duration is less than the time threshold, then the actuation is a lane change indication request, and if the actuation duration is greater than or equal to the time threshold, then the actuation is a conventional turn indication request.

Figure 2:
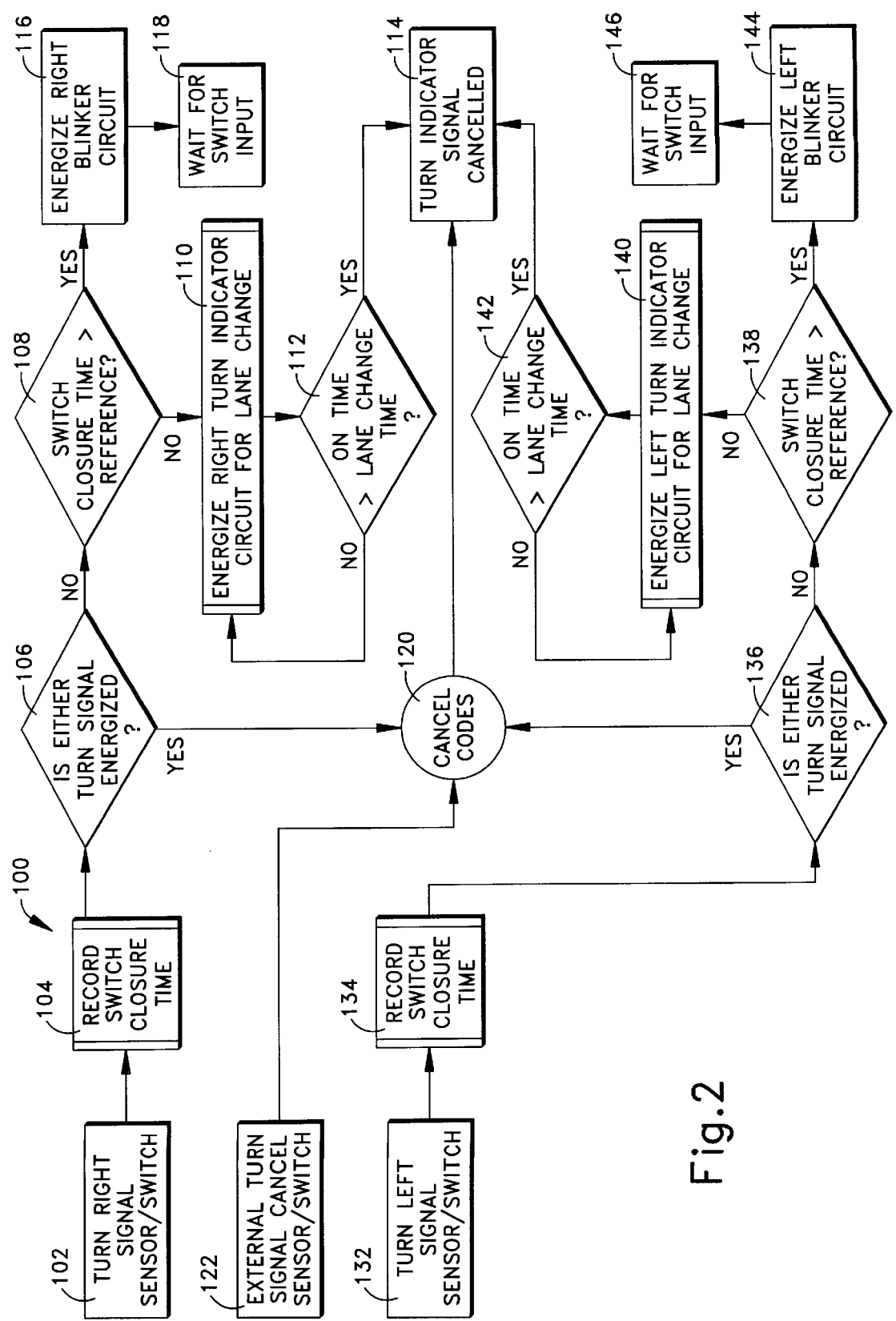
FIG. 2 is a flow chart of a process in accordance with the present invention and performed with the system shown in FIG. 1.

A process 100 in accordance with the present invention and performed within the system 10 is illustrated by FIG. 2. The process 100 has similar steps for both right and left turn indications. Accordingly, the process 100 is described primarily for right turn indication, with the understanding that similar steps are provided for left turn indication.

For a right turn indication, the process 100 begins at step 102, in which the vehicle driver presses the right-turn selector 14. The signal 22 is provided to the micro-controller 20, and at step 104, the timer function 46 determines the time that the selector 14 is pressed (i.e., the duration that the "switch" is closed). The memory 44 holds the time value of depression (actuation).

At step 106, it is determined whether either of the left turn or right turn indicator circuits 34 or 38 are currently energized. If the determination at step 106 is negative (i.e., neither of the indicator circuits are currently energized), the process 100 goes to the step 108. At step 108, it is determined whether the actuation time of the selector 14 (i.e., switch closure time) is greater than the reference time threshold value. In the preferred embodiment, the reference time threshold value is 0.25 seconds.

If the determination at step 108 is negative (i.e., the selector 14 is pressed for less than 0.25 seconds), the process 100 goes to step 110 in which the right turn indicator circuit 34 is energized for a lane change indication. Specifically, the right turn indicator circuit 34 is energized to be "ON" for only a short, predetermined time period (e.g., approximately 8 seconds), which is referred to as "lane change time". The process 100 goes to step 112, in which it is determined if the "ON" time of the right turn indicator circuit 34 is greater than the predetermined "lane change time". If the determination at step 112 is negative (e.g., the light array of the indicator circuit has been blinking for less than 8 seconds), the process 100 goes to step 110. The process 100 continues to repeat steps 110 and 112 until the lane change time has expired. Specifically, when the lane change ON time expires, the determination at step 112 is affirmative and the process 100 goes to step 114, in which the turn indicator signal is cancelled.

Focusing now on the situation in which the vehicle driver intends to have a conventional right turn indication. The vehicle driver presses the selector 14 for more than the predetermined reference time threshold (i.e., greater than 0.25 seconds). For such a situation, the determination at step 108 is affirmative, and the process 100 goes to step 116. At step 116, the right turn indicator circuit 34 is energized to provide the right turn indicator signal. The process 100 goes to step 118 in which a switch input is awaited. In other words, the right turn indicator circuit 34 will continue to be energized to provide the turn indicator signal until a switch input cancels the signal.

Focusing now on the situation in which the vehicle driver wishes to change or cancel a currently provided turn indicator signal. The driver presses either of the selectors 14 or 16. If the driver has pressed the selector 14 in order to cancel the currently provided indicator signal, the process 100 proceeds through steps 102 and 104 to step 106. At step 106, the determination will be affirmative and the process 100 will goes to step 120. At step 120, the signal code is cancelled and the process 100 proceeds to step 114 in which the turn indicator signal is cancelled.

Focusing attention now on the situation in which the driver has completed execution of a conventional turn and is in the process of rotating the steering wheel back toward neutral steer, a suitable steering wheel rotation sensor or switch provides a signal at step 122 of the process 100. The process 100 goes from step 122 to step 120 in which the signal code is cancelled, and the process goes to step 114 to cancel the turn indicator signal.

As noted above, similar steps are provided for left turn indication. Specifically, steps 132–146 are similar to steps 102–112, 116 and 118, respectively.

Figure 3:
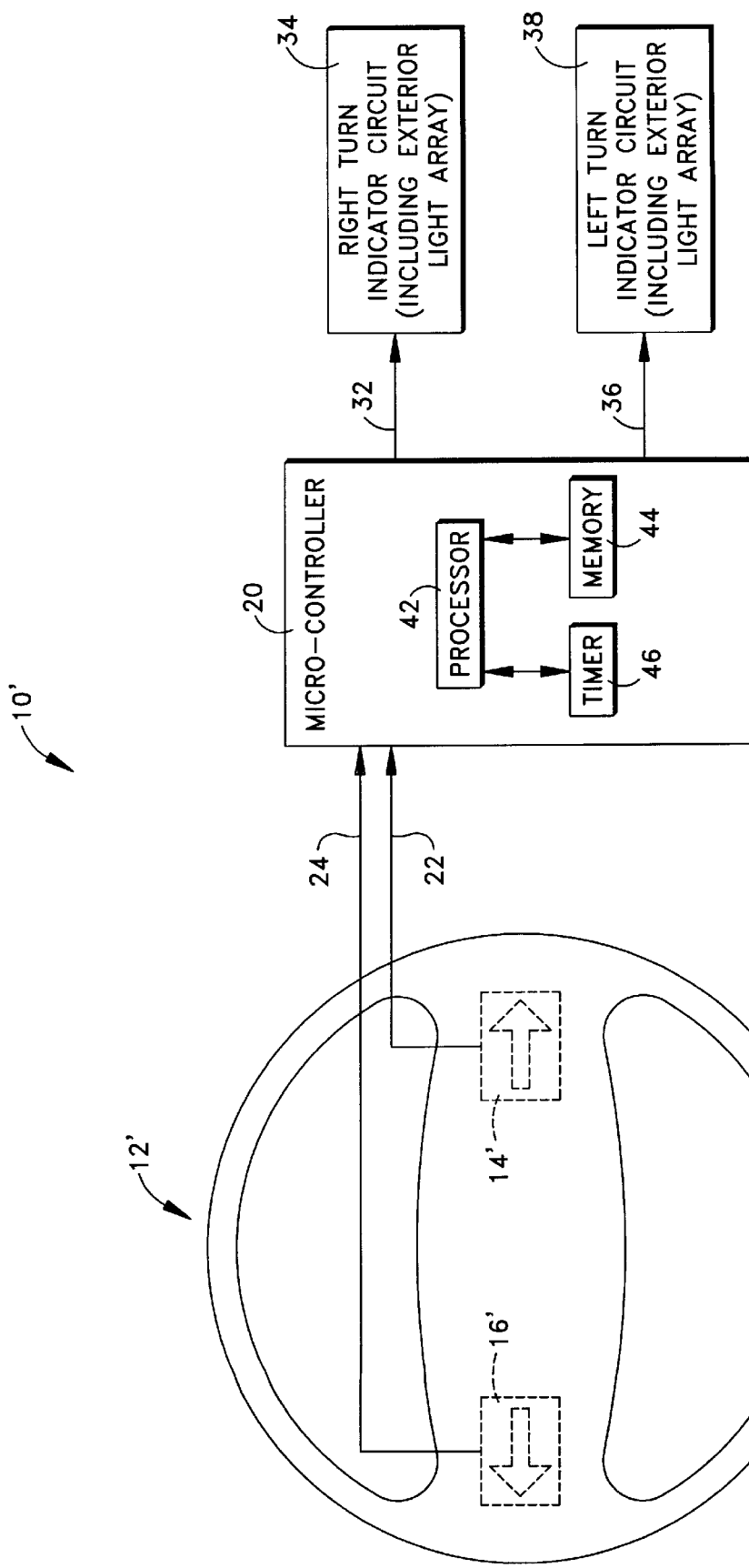
FIG. 3 is a schematic illustration of a second embodiment a turn signal system in accordance with the present invention.

An alternate embodiment of the system 10' is shown in FIG. 3. The difference between the embodiment of FIG. 1 and FIG. 3 is that the selectors 14' and 16' of the system 10' are located on a far side of the steering wheel 12' from the vehicle driver. Thus, as the vehicle driver grasps the wheel 12', the index fingers of the driver are located in close proximity to the selectors 14' and 16'.

From the above description of the invention, those skilled in the art will perceive improvements, changes and modifications. For example, the selectors may have a different arrangement on the steering wheel, such as being adjacent to each other on one side (e.g., left during neutral steer) of the steering wheel. The selectors may be combined into a single rocker-panel type arrangement (i.e., push or pull with thumb "right" for a right turn indicator signal, and push or pull "left" for a left turn indicator signal). Further, the selectors may have a different construction, such as a conventional contact-type switch. Also, the signals provided by the selectors may have different characteristics that can be determined to be above or below a predetermined characteristic threshold to provide the two manners of actuation. For example, different amounts of pressure applied to a selector result in different current flow values. Current flow above a predetermined amount is associated with a first manner of operation and current flow below a predetermined amount is associated with a second manner of operation. Such improvements, changes and modifications within the skill of the art are intended to be covered by the appended claims.

Having described the invention, the following is claimed:

1. A turn signal system for a vehicle having a steering wheel, said system comprising:

right signal means energizable for indicating an intended movement of the vehicle toward the right;

left signal means energizable for indicating an intended movement of the vehicle toward the left;

control means for selectively supplying energy to said right and left signal means;

a right selector pushbutton, located on the steering wheel, actuatable in a first manner for causing said control means to energize said right signal means to perform a first indication operation and actuatable in a second manner for causing said control means to energize said right signal means to perform a second indication operation; and a left selector pushbutton, located on the steering wheel, actuatable in a first manner for causing said control means to energize said left signal means to perform a first indication operation and actuatable in a second manner for causing said control means to energize said left signal means to perform a second indication operation.

2. A turn signal system as set forth in claim 1, wherein said control means includes means for energizing said right signal means to perform an indication operation of predetermined duration as the first indication operation of said right signal means and for energizing said right signal means to perform an indication operation maintained indefinitely until cancelled as the second indication operation of said right signal means, and said control means includes means for energizing said left signal means to perform an indication operation of predetermined duration as the first indication operation of said left signal means and for energizing said left signal means to perform an indication operation maintained indefinitely until cancelled as the second indication operation of said left signal means.

3. A turn signal system as set forth in claim 1, wherein said right and left selector pushbuttons are depressible, and said right and left selector pushbuttons include first and second deformable portions, respectively, that deform upon depression of the respective selector pushbutton, each of said deformable portions has an electrical characteristic that changes in response to deformation of said deformable portion.

4. A turn signal system as set forth in claim 3, wherein said control means includes means for monitoring the respective electrical characteristic of each of said first and second deformable portions.

5. A turn signal as set forth in claim 4, wherein each of said first and second deformable portions has an electrically conductive layer that has a resistance that changes in response to deformation.

6. A turn signal system as set forth in claim 1, wherein said right selector pushbutton is actuatable in a manner below a predetermined right selector threshold as the first actuation manner for causing said control means to energize said right signal means to perform the first indication operation and is actuatable in a manner above the predetermined right selector threshold as the second actuation manner for causing said control means to energize said right signal means to perform the second indication operation, and said left selector pushbutton is actuatable in a manner below a predetermined left selector threshold as the first actuation manner for causing said control means to energize said left signal means to perform the first indication operation and is actuatable in a manner above the predetermined left selector threshold as the second actuation manner for causing said control means to energize said left signal means to perform the second indication operation.

7. A turn signal system as set forth in claim 6, wherein the predetermined right selector threshold is a predetermined duration of actuation of said right selector pushbutton, and the predetermined left selector threshold is a predetermined duration of actuation of said left selector pushbutton, said control means includes means for timing actuation duration of said selector pushbuttons.

8. A turn signal system as set forth in claim 1, wherein said right and left selector pushbuttons are located on a portion of the steering wheel facing away from a driver.

9. A turn signal system for a vehicle having a steering wheel, said system comprising:

right signal means energizable for indicating an intended movement of the vehicle toward the right;

left signal means energizable for indicating an intended movement of the vehicle toward the left;

control means for selectively supplying energy to said right and left signal means;

a right selector pushbutton, located on the steering wheel, actuatable in a manner below a predetermined right selector threshold for causing said control means to energize said right signal means to perform a first indication operation and actuatable in a manner above the predetermined right selector threshold for causing said control means to energize said right signal means to perform a second indication operation; and a left selector pushbutton, located on the steering wheel, actuatable in a manner below a predetermined left selector threshold for causing said control means to energize said left signal means to perform a first indication operation and actuatable in a manner above the predetermined left selector threshold for causing said controller to energize said left signal means to perform a second indication operation.

10. A turn signal system as set forth in claim 9, wherein said right and left selector pushbuttons are depressible, and said right and left selector pushbuttons include first and second deformable portions, respectively, that deform upon depression of the respective selector pushbutton, each of said deformable portions has an electrical characteristic that changes in response to deformation of said deformable portion.

11. A turn signal system as set forth in claim 10, wherein said control means includes means for monitoring the respective electrical characteristic of each of said first and second deformable portions.

12. A turn signal as set forth in claim 11, wherein each of said first and second deformable portions has an electrically conductive layer that has a resistance that changes in response to deformation.

13. A turn signal system as set forth in claim 9, wherein the predetermined right selector threshold is a predetermined duration of actuation of said right selector pushbutton, and the predetermined left selector threshold is a predetermined duration of actuation of said left selector pushbutton, said control means including means for timing actuation duration of said selector pushbuttons.

14. A turn signal system as set forth in claim 9, wherein said control means includes means for energizing said right signal means to perform an indication operation of predetermined duration as the first indication operation of said right signal means and for energizing said right signal means to perform an indication operation maintained indefinitely until cancelled as the second indication operation of said right signal means, and said control means includes means for energizing said left signal means to perform an indication operation of predetermined duration as the first indication operation of said left signal means and for energizing said left signal means to perform an indication operation maintained indefinitely until cancelled as the second indication operation of said left signal means.

15. A turn signal system as set forth in claim 9, wherein said right and left selector pushbuttons are located on a portion of the steering wheel facing away from a driver.

16. A turn signal system for a vehicle having a steering wheel, said system comprising:

right signal means energizable for indicating an intended movement of the vehicle toward the right;

left signal means energizable for indicating an intended movement of the vehicle toward the left;

control means for selectively supplying energy to said right and left signal means;

a right selector pushbutton, located on the steering wheel, actuatable in a first manner for causing said control means to energize said right signal means in an indication operation of predetermined duration and actuatable in a second manner for causing said control means to energize said right signal means in an indication operation maintained indefinitely until cancelled; and a left selector pushbutton, located on the steering wheel, actuatable in a first manner for causing said control means to energize said left signal means in an indication operation of predetermined duration and actuatable in a second manner for causing said control means to energize said left signal means in an indication operation maintained indefinitely until cancelled.

17. A turn signal system for a vehicle having a steering wheel, said system comprising:

right signal means energizable for indicating an intended movement of the vehicle toward the right;

left signal means energizable for indicating an intended movement of the vehicle toward the left;

a right selector pushbutton, located on the steering wheel, actuatable in first and second manners for selecting said right signal means for energization;

a left selector pushbutton, located on the steering wheel, actuatable in first and second manners for selecting said left signal means for energization; and control means for selectively supplying energy to said right and left signal means in response to actuation of said right or left selector pushbuttons, said control means including means for distinguishing between the first and second manners of actuation of said right selector pushbutton for energizing said right signal means for a first indication operation in response to the first manner of actuation of said right selector pushbutton and for energizing said right signal means for a second indication operation in response to the second manner of actuation of said right selector pushbutton, and said control means including means for distinguishing between the first and second manners of actuation of said left selector pushbutton and for energizing said left signal means for a first indication operation in response to the first manner of actuation of said left selector pushbutton and for energizing said left signal means for a second indication operation in response to the second manner of actuation of said left selector pushbutton.

18. A method of indicating intended movement of a vehicle having a steering wheel, said method comprising:

actuating a right selector pushbutton on the steering wheel in a first manner to cause right signal means to be energized in an indication operation of predetermined duration;

actuating the right selector pushbutton in a second manner to cause the right signal means to be energized in an indication operation maintained indefinitely until cancelled;

actuating a left selector pushbutton on the steering wheel in a first manner to cause left signal means to be energized in an indication operation of predetermined duration; and actuating the left selector pushbutton in a second manner to cause the left signal means to be energized in an indication operation maintained indefinitely until cancelled.

* * * * *